(12) United States Patent
Linkola

(10) Patent No.: US 7,113,800 B2
(45) Date of Patent: Sep. 26, 2006

(54) METHOD AND SYSTEM FOR THE ROUTING OF SHORT MESSAGES

(75) Inventor: Janne Linkola, Helsinki (FI)

(73) Assignee: Teliasonera Finland Oyj, Helsinki (FI)

( * ) Notice: Subject to any disclaimer, the term of this patent is extended or adjusted under 35 U.S.C. 154(b) by 667 days.

(21) Appl. No.: 09/915,009

(22) Filed: Jul. 25, 2001
(Under 37 CFR 1.47)

(65) Prior Publication Data

US 2005/0119015 A1  Jun. 2, 2005

Related U.S. Application Data

(63) Continuation of application No. PCT/FI00/00046, filed on Jan. 20, 2000.

(30) Foreign Application Priority Data

Jan. 25, 1999  (FI) .................................... 990135

(51) Int. Cl.
 *H04Q 7/20* (2006.01)
(52) U.S. Cl. ................. 455/466; 455/445; 455/552.1; 455/426.1
(58) Field of Classification Search ................ 455/466, 455/412.1, 412.2, 560, 445, 517, 552.1, 426.1; 370/236, 351, 352, 353, 354, 355, 356, 357, 370/360, 522, 401, 410, 428, 465, 466, 467, 370/469, 389, 392; 379/229, 220.01
See application file for complete search history.

(56) References Cited

U.S. PATENT DOCUMENTS

| 5,742,905 | A | * | 4/1998 | Pepe et al. ................... 455/445 |
| 5,946,629 | A | * | 8/1999 | Sawyer et al. ............... 455/466 |
| 6,298,232 | B1 | * | 10/2001 | Marin et al. ................. 455/466 |
| 6,321,257 | B1 | * | 11/2001 | Kotola et al. ................ 709/219 |
| 6,389,276 | B1 | * | 5/2002 | Brilla et al. ................. 455/413 |
| 6,507,589 | B1 | * | 1/2003 | Ramasubramani et al. . 370/465 |
| 6,587,693 | B1 | * | 7/2003 | Lumme et al. ............. 455/466 |
| 6,611,516 | B1 | * | 8/2003 | Pirkola et al. .............. 455/466 |
| 6,745,041 | B1 | * | 6/2004 | Allison et al. .............. 455/466 |

(Continued)

FOREIGN PATENT DOCUMENTS

CN  1362821  *  8/2002

(Continued)

*Primary Examiner*—Danh Cong Le
(74) *Attorney, Agent, or Firm*—Cohen, Pontani, Lieberman & Pavane

(57) ABSTRACT

A method and a system for routing a short message into a data network in a telecommunication system that comprises a subscriber's terminal device, a first short message service center, a second short message service center and a data network connected to the second short message service center. The short message service center defined as active in the terminal device is the first short message service center. A short message sent from the terminal device to a predetermined destination number is routed from the first short message service center via a special converter component to the data network. The short message in Mobile Terminated format is converted in the converted component into a short message of Mobile Originated format and is then sent to the second short message service center. The inventive system includes means for routing the short message from the first short message service center via the converter component to the data network, and the converter component comprises means for converting a Mobile Terminated format short message into a Mobile Originated format short message and means for sending the short message to the second short message service center.

14 Claims, 2 Drawing Sheets

U.S. PATENT DOCUMENTS

| | | | |
|---|---|---|---|
| 6,856,808 B1 * | 2/2005 | Comer et al. | 455/466 |
| 2001/0030957 A1 * | 10/2001 | McCann et al. | 370/401 |
| 2002/0173320 A1 * | 11/2002 | Aitken et al. | 455/466 |
| 2003/0003930 A1 * | 1/2003 | Allison et al. | 455/466 |
| 2003/0016639 A1 * | 1/2003 | Kransmo et al. | 370/352 |

FOREIGN PATENT DOCUMENTS

| | | | |
|---|---|---|---|
| WO | 97/20442 | | 6/1997 |
| WO | 97/36434 | | 10/1997 |
| WO | 98/28920 | | 7/1998 |
| WO | 98/30051 | | 7/1998 |
| WO | 98/32300 | | 7/1998 |
| WO | 98/56195 | | 12/1998 |
| WO | 99/57926 | | 11/1999 |
| WO | 00/10294 | | 2/2000 |
| WO | 00/47004 | * | 8/2000 |
| WO | 01/22752 | * | 3/2001 |

* cited by examiner

METHOD AND SYSTEM FOR THE ROUTING OF SHORT MESSAGES

This is a continuation of PCT Appliation No. PCT/FI00/00046, filed on Jan. 20, 2000, which claims priority from Finland Application No. FI 990135, filed Jan. 25, 1999.

BACKGROUND OF THE INVENTION

1. Field of the Invention

The present invention relates to telecommunication systems. In particular, the invention is directed to a method and system for the routing of short messages.

2. Description of Related Art

The known phrase "short message service" refers to a telecommunication service for the transmission and receipt of short text messages. In a GSM (Global System for Mobile communications) mobile communication network, for example, the short message service provides a means for sending messages having a maximum length of 160 characters to a GSM terminal. Implementing of a short message service requires a short message service center which functions as a center at which short messages are stored and from which they are further transmitted. Typically, a particular short message service center of a mobile network is set up or defined, in the telecommunication terminal (such as a mobile station), as the one with which that terminal communicates in carrying out short messaging functions and communication. There are two point-to-point functions defined for the short message service: Mobile Originated, which denotes a message originated by a telecommunication terminal or terminal device; and Mobile Terminated, which denotes a message that is addressed to a telecommunication terminal or device.

Many services operated using or by means of short messages have been implemented in telecommunication networks, and particularly in mobile communication networks. In a bank service application, for example, the user of a telecommunication terminal can pay his bills using a short message service. To do this, the user sends a short message in a predetermined format through a short message service center to a predetermined number. The predetermined format of the short message contains the data required for execution of the bank service function. The predetermined number has been defined as a particular address in a fixed data network, and the short message service center performs an address conversion from the predetermined number to the data network address. A bank application in the data network processes the command delivered in the short message and sends a response via the short message center to the user of the telecommunication terminal from which the request originated.

In the situation described above, the short message service center is an essential component for the bank application; i.e., because the short message service center has to perform a specific address conversion, the application is dependent on the operation and required functionality that is provided by that particular short message service center and often on the network operator as well. This necessary reliance is a source of problems for subscribers using different networks because the service application is therefore only available in certain networks. If a subscriber in a first network wants to use a service application provided in a second or different network, then the subscriber has to specially define or redefine, in his telecommunication terminal, a short message service center of the second network for the time during which he is using the service application. The subscriber must also perform this operation between two short message service centers in the network of the same operator.

Heretofore known is a method by which a short message of Mobile Terminated format can be forwarded, as a short message in Mobile Originated format, by means of a telecommunication terminal. However, the short message must cross a radio interface, and thus necessarily entails a waste of limited radio network capacity. This method cannot, moreover, be applied to a large number of short messages that must be simultaneously transmitted. In a known solution, the operator of the first network may perform a conversion service in a short message service center in the first network; this requires, however, special agreement between the operators of the first and second networks.

OBJECTS AND SUMMARY OF THE INVENTION

It is accordingly the desideratum of the present invention to eliminate, or at least significantly reduce or alleviate, the drawbacks and deficiencies inherent in prior art systems and methods such, for example, as those described hereinabove.

It is a particular object of the invention to provide a novel method and system that enable the use of short message-based data network services independently of the particular short message service center that is defined in (and thus used by) the mobile station.

In one aspect the present invention is directed to a method for routing a short message into a data network in a telecommunication system that comprises a mobile communication network and, connected to the mobile communication network, a telecommunication terminal, a first short message service center and a data network. The short message service center defined in, for use by, the telecommunication terminal is the first short message service center. In the inventive method, a short message that is addressed to a predetermined destination number is routed from the terminal to the first short message service center. A mobile switching center that is defined or located in the numerical addressing range of the mobile communication network is determined from the destination number. The numerical range may, by way of example, correspond to the numbering scheme E.164. The short message is routed from the first short message service center in Mobile Terminated format to the predetermined destination number.

More particularly, and in further accordance with the inventive method, the short message is routed from the first short message service center to a special converter component on the basis of the predetermined destination number that refers to the converter component and which is in the numerical range of the mobile communication network. The converter component is a novel and heretofore unknown type of network component that implements particular functions in the mobile switching center. The short message is then routed from the converter component to the data network.

Various embodiments may be implemented using one or more of a number of variations and refinements as herein disclosed. Thus, the data network may be connected to the converter component and the short message transmitted directly from the converter component into the data network. The converter component may be located at a network address of or corresponding to the mobile switching center.

The predetermined short message destination number referring to the converter component may be converted in the converter component into a destination number that refers to the data network. The destination number is preferably comprised in or as a part of the numbering scheme of a global mobile communication network, which means that it will be possible to be connected to the data network via existing telecommunication terminals regardless of the network or operator. In other words, a short message can be routed to the data network simply by using a number that refers to or identifes the converter component.

The invention is further directed to a method for routing a short message in a telecommunication system as described above but additionally comprising a second short message service center to which the data network is connected. In accordance with this modified implementation of the invention, the short message is routed from the first short message service center to the converter component on the basis of a destination number that refers to the first short message center and that is part of the number range of the mobile communication network. A Mobile Terminated format short message is converted in the converter component into a Mobile Originated format short message and routed to the second short message service center. The converter component may be located at a network address of or corresponding to the mobile switching center.

The short message destination number that refers to the converter component may be converted into a destination number that refers to the second short message service center, this second or latter destination number again referring to a destination number in the data network connected to the second short message service center. The destination number conversions are so chained that the data network and the service implemented in the data network will eventually be reached by initial use of a number that refers to the converter component in the user's "home" or otherwise directly-accessible communications network.

An acknowledgement message may also be routed from the second short message service center to the first short message service center via the converter component. In this way, the first short message service center receives an acknowledgement message in response to receipt of the Mobile Terminated format short message.

The invention additionally provides a system for the routing of a short message into a data network from a telecommunication system that comprises a mobile communication network and, connected to the mobile network, a telecommunication terminal, a first short message service center and a data network. The first short message service center is defined in the telecommunication terminal as the active short message service center. In the inventive system, a short message that is routed to a predetermined destination number is addressed from the telecommunication terminal to the first short message service center. A mobile switching center identified or designated in the numerical range of the mobile communication network is determined from the destination number of the short message and the short message is then routed from the first short message service center in Mobile Terminated format to the predetermined destination number.

The system of the invention comprises a converter component connected to the mobile communication network, and the short message destination number in the numerical range of the mobile communication network refers to that converter component. The system further comprises means for routing the short message from the first short message service center to the converter component based on the destination number which refers to the converter component, and means for routing the short message from the converter component to the data network. The converter component is preferably located at a network address that corresponds to the mobile switching center. In some embodiments of the invention, the data network is connected to the converter component.

In implementing the inventive system, the converter component may comprise means for converting a predetermined short message destination number that refers to the converter component into a destination number that refers to the data network.

The present invention further provides a system for the routing of a short message in a telecommunication system as described above but additionally comprising a second short message service center to which the data network is connected. The converter component is connected to the mobile communication network, and has a destination number that is defined in the numerical range of the mobile communication network. The converter component comprises means for converting a Mobile Terminated format short message into a Mobile Originated format short message, and means for sending the converted format short message to the second short message service center. The converter component is preferably located at a network address that corresponds to the mobile switching center.

The converter component may, in various embodiments of the inventive system, comprise means for converting a predetermined short message destination number that refers to the converter component into a destination number that refers to the second short message service center, which in turn refers to a destination number in the data network.

The system may also comprise means for routing an acknowledgement message from the second short message service center to the first short message service center via the converter component. This arrangement enables the first short message service center to receive an acknowledgement message in response to receipt of the Mobile Terminated format short message.

The mobile communication network utilized or present in some implementations and embodiments of the inventive method and system as described above is based on a digital mobile communication system, such for example as a GSM (Global System for Mobile communication) system.

As compared with the prior art, the present invention advantageously enables the use of Mobile Terminated format short messages which are transmitted from network to network. Short message applications provided in another, different network can therefore be utilized without operators or users having to make any changes to existing equipment. No separate agreement is needed between operators to allow the use of services provided by another operator, and the user need not set or define in his mobile station the access or routing number of the short message service center of the other operator in order to use, and for the time that he is using, a service provided by the other operator. The invention accordingly allows for world-wide utilization of a service as a consequence of the global numbering system that is used in the mobile communication network.

The invention may be applied to a form of service in which, for example, a television advertisement or like interactive medium presents a question and a telephone number to which a text message can be sent. In this way it is possible to implement applications such as telephonic polls using text messages, thus avoiding the congestion that would result from the use of a conventional switched connection in the conduct of such polls. This form of service is also advantageous to the user since the connection functions without regard to the particular active short message service center assigned for each subscriber. The invention furthermore allows a large number of calls to be simultaneously connected to a data network via a text message service.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several Figures.

DETAILED DESCRIPTION OF THE CURRENTLY PREFERRED EMBODIMENTS

Figure 1A:
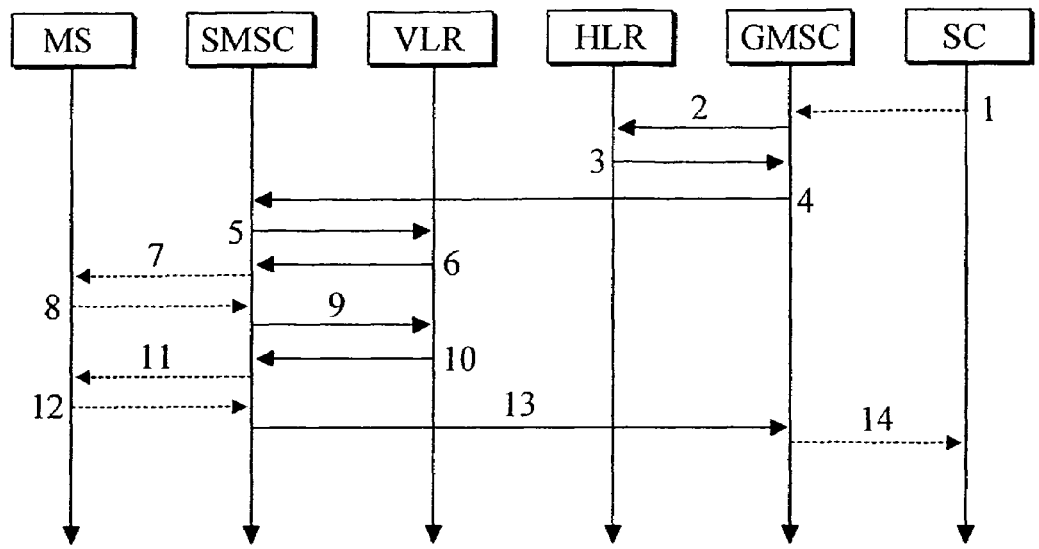
FIGS. 1a and 1b schematically depict prior art signaling schemes.

FIG. 1a illustrates typical signaling that currently takes place in a GSM communication system for a Mobile Terminated short message. With reference to the numbered arrows in that Figure, a short message consistent with GSM specification 03.40 is sent (arrow 1) from a short message service center SC to a mobile switching center GMSC that serves as a gateway. The mobile switching center GMSC queries (arrow 2) the subscriber's home location register HLR for routing data for the subscriber using the MAP (Mobile Application Part) operation MAP_SEND_ROUTING_INFO_FOR_SM. The home location register HLR responds to the query (arrow 3). The mobile switching center GMSC routes the short message (arrow 4) to mobile switching center SMSC using a MAP_MT_FORWARD_SHORT_MESSAGE operation, and mobile switching center SMSC queries (arrow 5) the visitor location register VLR for the location of the B-party using a MAP SEND_INFO_FOR MT_SMS operation. The visitor location register VLR then responds to the query (arrow 6) with a MAP_PAGE/MAP_SEARCH_FOR_MOBILE_SUBSCRIBER operation. Mobile switching center SMSC searches the network (arrow 7) to reach the mobile station MS using a BSSAP (Base Station System Application Part) operation as described in GSM specification 04.08. The mobile station MS responds (arrow 8) to the search. Mobile switching center SMSC then sends (arrow 9) to the visitor location register VLR an acknowledgement that it has reached the mobile station MS, and the visitor location register VLR sends (arrow 10) an acknowledgement to the mobile switching center SMSC. The mobile switching center sends the short message to the mobile station MS (arrow 11) in the manner described by GSM specification 04.11. The mobile station MS sends an acknowledgement (arrow 12) of its receipt of the short message to the mobile switching center SMSC, which then sends (arrow 13) an acknowledgement to the mobile switching center GMSC that serves as the gateway. Mobile switching center GMSC additionally sends (arrow 14) to the short message service center SC an acknowledgement of transmission of the short message.

Figure 1B:
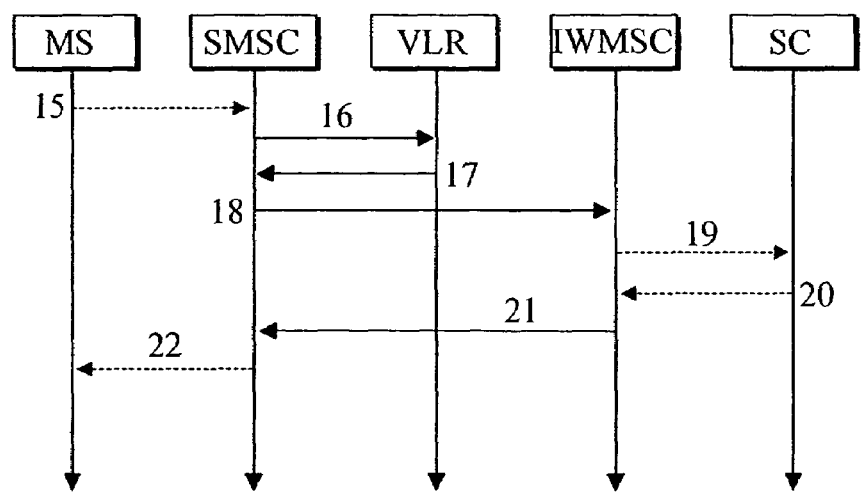

FIG. 1b similarly illustrates the typical signaling operations that currently take place in a GSM system for a Mobile Originated short message.

As seen in FIG. 1b, the process begins when a mobile station MS sends (arrow 15) a short message to a mobile switching center SMSC in the manner described in GSM specification 04.11. The mobile switching center SMSC checks (arrow 16) the subscriber information in the visitor location register VLR using a MAP_SEND_INFO_FOR_MO_SMS operation, and the visitor location register VLR sends (arrow 17) an acknowledgement of the message to the mobile switching center SMSC. The mobile switching center SMSC then routes (arrow 18) the short message to another mobile switching center IWMSC using a MAP_MO_FORWARD_SHORT_MESSAGE operation. The short message is routed (arrow 19) to the short message service center SC in the manner described in GSM specification 03.40, and the short message service center SC sends (arrow 20) an acknowledgement of the short message to mobile switching center IWMSC. Mobile switching center IWMSC also sends (arrow 21) an acknowledgement of the short message to mobile switching center SMSC using a MAP_MO_FORWARD_SHORT_MESSAGE_ACK operation, and mobile switching center SMSC sends (arrow 22) an acknowledgement of the short message to the mobile station MS using a BSSAP operation as described in GSM standard 04.11.

Figure 2:
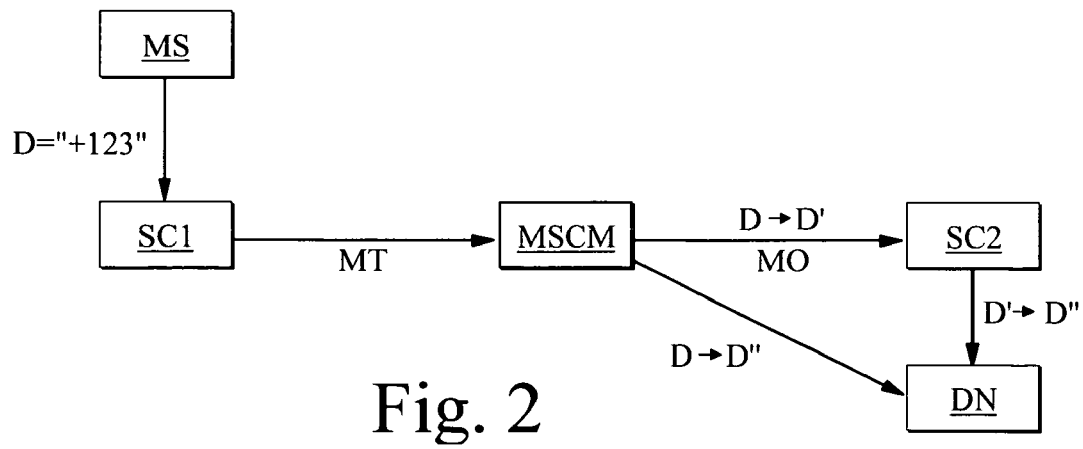
FIG. 2 is a diagrammatic block diagram of a system constructed in accordance with the present invention.

FIG. 2 depicts, in diagrammatic block form, a preferred embodiment of a system constructed and configured in accordance with the present invention. It will however be recognized and apparent to persons skilled in the art that FIG. 2 shows only those components essential to the operation of the invention, and thus not all of the devices and components that typically form or are used in conjunction with such a telecommunication network are included in FIG. 2.

As seen in FIG. 2, a mobile station MS is connected to a digital mobile communication network, as for example a GSM network. In the mobile station MS, short message service center SC1 has been defined as the active station or center through which short messages sent or received by that mobile station are to be transmitted. In the therein-depicted embodiment the inventive system further comprises a second short message service center SC2 to which a data network DN is connected. The short message service centers SC1 and SC2 may belong to or be a part of separate mobile communication networks that are managed by different operators or a single network that is managed by a single operator.

Connected between the mobile switching centers SC1, SC2 is a converter component MSCM of the invention. In the embodiment shown and now described by way of illustrative example, the mobile station MS and the first short message service center SC1 belong to the network of a different operator than do the converter component MSCM, the second short message service center SC2 and the data network DN. The present invention is nevertheless applicable, and operable, no matter where the network components are located and, indeed, the network components may be located in or form a part of or belong to any network. Moreover, the converter component MSCM can be a standalone device, as shown in the drawing, or integrated as a part of some other suitable network component.

From mobile station MS, a short message is sent into the data network DN by using address or directive numbering that refers to the converter component MSCM. In the illustrated example, the short message is sent to telephone number D; the numeric sequence "+123" at the beginning of telephone number D refers to the converter component MSCM. Converter component MSCM comprises means for routing the short message into the data network DN, with the telephone number D being converted into an address D' that refers to the second short message service center SC2. The short message is then routed further along the data network DN, with the short message service center SC2 converting the telephone number D' into the ultimate destination address D" in data network DN.

Using means provided in converter component MSCM, the telephone number D can also be converted directly into the address D" in data network DN. In that case, the data network DN is connected to converter component MSCM and the short message is transferred directly from converter component MSCM into data network DN without any actions being performed by second short message service center SC2. The interface between the converter component MSCM and data network DN is similar to that between the short message service center SC2 and data network DN. In addition, either one or two transmission links may be provided to data network DN. The reasons for using such alternative routing may be based on, by way of example, the particular data network destination address D", the time, the contents of the message, or a malfunction in the second short message service center SC2, any of which may require the use of an alternative route.

The converter component MSCM comprises means for converting a Mobile Terminated format short message into a Mobile Originated format short message. This conversion is carried out by converting fields for messages in Mobile Terminated format into the fields of the Mobile Originated format. The converter component MSCM also comprises means for converting an acknowledgement message received from the second short message service center GMSC2 in response to a Mobile Originated format short message so that the telecommunication terminal MS sees the acknowledgement message as an answer to the original message. The fields to be converted may for example be presented in the MAP protocol items MAP_MT_FORWARD_SHORT_MESSAGE and MAP_MO_FORWARD_SHORT_MESSAGE, which are described in the GSM 09.02 v6.1.0 standard.

The following information elements in the original Mobile Terminated message are essential to the operation and use of the present invention:

SM RP OA—contains the first short message service center SC1.

SM RP DA—contains the GSM network subscriber identity IMSI that corresponds to the destination number D.

SM RP UI—contains a data element of the next protocol level TPDU, comprising the information element TP-OA which contains the telephone number (MSISDN1) of the sender (MS) of the message.

The following information elements are set in accordance with the invention in the converted Mobile Originated message:

SM RP OA—the TP-OA found in the TPDU which was in the SM RP UI field in the Mobile Terminated message.

SM RP DA—the address of the second short message service center SC2.

SM RP UI—the second address D' corresponding to the IMSI, found in the converter component MSCM, is set in the TPDU element field TP-DA found in SM RP UI.

The converter component MSCM is implemented so that it performs in part some of the same functions as the mobile switching center MSC defined in conjunction with mobile communication systems. The number of functions implemented in the converter component MSCM is nevertheless considerably smaller than those of the mobile switching center, so that the converter component MSCM is simpler in construction, easier to design and operate, and less expensive to manufacture and maintain.

In location updating, the converter component MSCM implements the functions of the visitor location register VLR. For updating, the subscriber register for the destination address or destination subscription of the original short message is used as a home location register HLR. The converter component performs the MAP_UPDATE_LOCATION operation, responds to the MAP_INSERT_SUBSCRIBER_DATA with an appropriate acknowledgement message and receives a message acknowledging the MAP_UPDATE_LOCATION operation.

Figure 3:
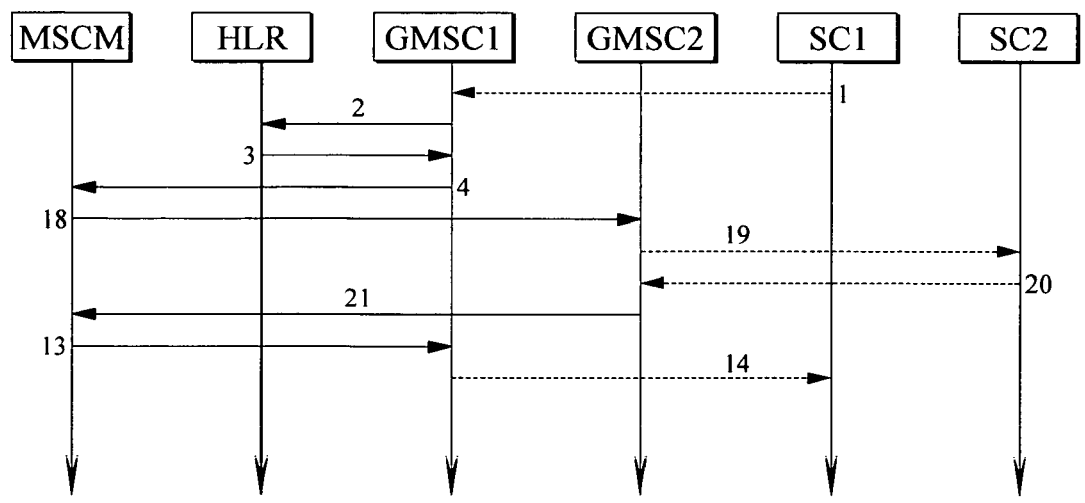
FIG. 3 schematically depicts a signaling scheme in accordance with the invention.

FIG. 3 depicts a preferred signaling scheme and procedure in accordance with the invention. The arrow numbers in FIG. 3 that also appear in FIGS. 1a and 1b identify the corresponding signaling operations for Mobile Terminated and Mobile Originated short messages.

With specific reference to FIG. 3, a subscriber A sends a short message to the number B1 via his active (i.e., defined) short message service center SC1. The short message is transmitted to short message service center SC1 as a normal Mobile Originated short message. Short message service center SC1 routes (arrow 1) the received short message to mobile switching center GMSC1 which detects, as for example using a part or prefix at the beginning of the number B1, that the short message is destined for another telephone network. Mobile switching center GMSC1 then sends (arrow 2) a routing query to the home location register HLR, and the home location register HLR responds (arrow 3) to the query. The home location register HLR contains data indicating that the subscriber is located in the area of the converter component MSCM; in other words, the home location register HLR sees the converter component MSCM as a mobile switching center. Mobile switching center GMSC then routes (arrow 4) the short message to the converter component MSCM using a MAP_MT_FORWARD_SHORT_MESSAGE operation.

The converter component MSCM is the inventive signaling component which converts the Mobile Terminated format short message into a Mobile Originated format short message. The format of the short message is so changed that the short message will seem to be on its way from subscriber A to short message service center SC2 to the number D'. The converter component MSCM routes (arrow 18) the converted short message to mobile switching center GMSC2 using a MAP_MO_FORWARD_SHORT_MESSAGE operation, and the short message is transmitted (arrow 19) to short message service center SC2. Short message service center SC2 sends (arrow 20) an acknowledgement of the short message to mobile switching center GMSC2, which sends (arrow 21) an acknowledgement of the Mobile Originated format short message to mobile switching center MSCM using a MAP_MO_FORWARD_SHORT_MESSAGE operation. The converter component MSCM sends (arrow 13) an acknowledgement of the Mobile Terminated format short message to mobile switching center GMSC1, which sends (arrow 14) to short message service center SC1 an acknowledgement of the transmitted short message.

At the same time, short message service center SC2 receives the message in the normal manner and converts the address D' into the destination data network address D", i.e., the address at which the actual service application is located. The service application at the address D" sees that the short message has been transmitted from subscriber A via short message service center SC2. The service application processes the short message and sends a response, setting the sender number as B2. Short message service center SC2 receives the short message and sends a response message to subscriber A by a known procedure. The response message sent by the service application need not be routed via the converter component MSCM. Subscriber A sees that the response message has arrived from the number B2 via short message service center SC2, and one transaction has thereby been completed.

In accordance with the invention, transmission of the Mobile Terminated format short message is interrupted when the short message has reached the center which is the converter component MSCM. The short message is then transmitted to the second short message service center SC2, just as if the short message had been received via the radio interface. The mode of operation is then changed or converted into that of a Mobile Originated short message, whereupon the original Mobile Terminated message is acknowledged.

Correspondingly, in a situation in which the data network DN is connected to the converter component MSCM, no conversion from a Mobile Terminated type message into a Mobile Originated type short message is performed but, instead, the short message is routed directly from the converter component MSCM into data network DN. In this case, and with reference to FIG. 3, signaling messages 1, 2, 3, 4, 13 and 14 are employed. The interface between the converter component MSCM and data network DN is so implemented that it resembles the interface between the short message service center SC2 and data network DN.

Thus, while there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. In a method for routing a short message into a data network in a telecommunication system that includes a mobile communication network to which the data network is connected, a telecommunication terminal connected to the mobile communication network, and a first short message service center connected to the mobile communication network and defined in the telecommunication terminal for use by the telecommunication terminal in connection with short messaging, and wherein a short message addressed to a predetermined destination number is routed from the telecommunication terminal to the first short message service center, a mobile switching center in a numerical range of the mobile communication network is determined from the predetermined destination number of the addressed short message, and the short message is routed in Mobile Terminated format from the first short message service center to the predetermined destination number, the improvement comprising the steps of:
routing the short message from the first short message service center to a converter component based on the predetermined destination number which refers to the converter component and which is in the numerical range of the mobile communication network;
converting, in the converter component, the predetermined destination number of the short message into a second destination number that refers to the data network; and
routing the short message from the converter component into the data network.

2. In a method in accordance with claim 1, wherein the converter component is disposed at a network address corresponding to the mobile switching center.

3. In a method in accordance with claim 1, wherein the data network is connected to the converter component.

4. In a method for routing a short message into a data network in a telecommunication system that includes a mobile communication network, a telecommunication terminal connected to the mobile communication network, a first short message service center connected to the mobile communication network and defined in the telecommunication terminal for use by the telecommunication terminal in connection with short messaging, and a second short message service center to which the data network is connected, and wherein a short message addressed to a predetermined destination number is routed from the telecommunication terminal to the first short message service center, a mobile switching center in a numerical range of the mobile communication network is determined from the predetermined destination number of the addressed short message, and the short message is routed in Mobile Terminated format from the first short message service center to the predetermined destination number, the improvement comprising the steps of:
routing the short message from the first short message service center to a converter component based on the predetermined destination number which refers to the converter component and which is in the numerical range of the mobile communication network;
converting, in the converter component, the Mobile Terminated format short message into a Mobile Originated format short message; and
routing the converted short message from the converter component to the second short message service center.

5. In a method in accordance with claim 4, wherein the converter component is disposed at a network address corresponding to the mobile switching center.

6. In a method in accordance with claim 4, wherein the data network is connected to the second short message service center, further comprising the step of converting, in the converter component, the predetermined destination number of the short message into a second destination number that refers to the second short message service center and to a third destination number in the data network.

7. In a method in accordance with claim 4, further comprising the step of routing, from the second short message service center to the first short message service center via the converter component, an acknowledgement message in response to receipt of the Mobile Terminated format short message by the second short message service center.

8. In a system for routing a short message into a data network in a telecommunication system that includes a mobile communication network to which the data network is connected, a telecommunication terminal connected to the mobile communication network, and a first short message service center connected to the mobile communication network and defined in the telecommunication terminal for use by the telecommunication terminal in connection with short messaging, and wherein a short message addressed to a predetermined destination number is routed from the telecommunication terminal to the first short message service center, a mobile switching center in a numerical range of the mobile communication network is determined from the predetermined destination number of the addressed short message, and the short message is routed in Mobile Terminated format from the first short message service center to the predetermined destination number, the improvement comprising:

a converter component connected to the mobile communication network and referred to by a destination number in the numerical range of the mobile communication network;

means for routing the short message from the first short message center to the converter component based on the predetermined destination number which refers to the converter component;

means, in the converter component, for converting the predetermined destination number into a second destination number that refers to the data network; and means for routing the short message from the converter component into the data network.

9. In a system in accordance with claim 8, wherein the converter component is located at a network address corresponding to the mobile switching center.

10. In a system in accordance with claim 8, wherein the data network is connected to the converter component.

11. In a system for routing a short message into a data network in a telecommunication system that includes a mobile communication network, a telecommunication terminal connected to the mobile communication network, a first short message service center connected to the mobile communication network and defined in the telecommunication terminal for use by the telecommunication terminal in connection with short messaging, and a second short message service center to which the data network is connected, and wherein a short message addressed to a predetermined destination number is routed from the telecommunication terminal to the first short message service center, a mobile switching center in a numerical range of the mobile communication network is determined from the predetermined destination number of the addressed short message, and the short message is routed in Mobile Terminated format from the first short message service center to the predetermined destination number, the improvement comprising:

a converter component connected to the mobile communication network and referred to by the predetermined destination number in the numerical range of the mobile communication network, said converter component comprising means for converting the Mobile Terminated format short message into a Mobile Originated format short message and means for sending the converted short message to the second short message service center.

12. In a system in accordance with claim 11, wherein the converter component is located at network address corresponding to the mobile switching center.

13. In a system in accordance with claim 11, wherein the converter component further comprises means for converting the predetermined destination number into a second destination number that refers to the second short message service center and to a third destination number in the data network.

14. In a system in accordance with claim 11, the improvement further comprising means for routing an acknowledgement message from the second short message service center to the first short message service center via the converter component to thereby provide to the first short message service center an acknowledgement in response to receipt of the Mobile Terminated format short message.

* * * * *